Feb. 25, 1964  C. A. COBB ETAL  3,122,358
TIMER HEAT REDUCTION DRIER CONTROL
Filed July 26, 1960  3 Sheets-Sheet 1
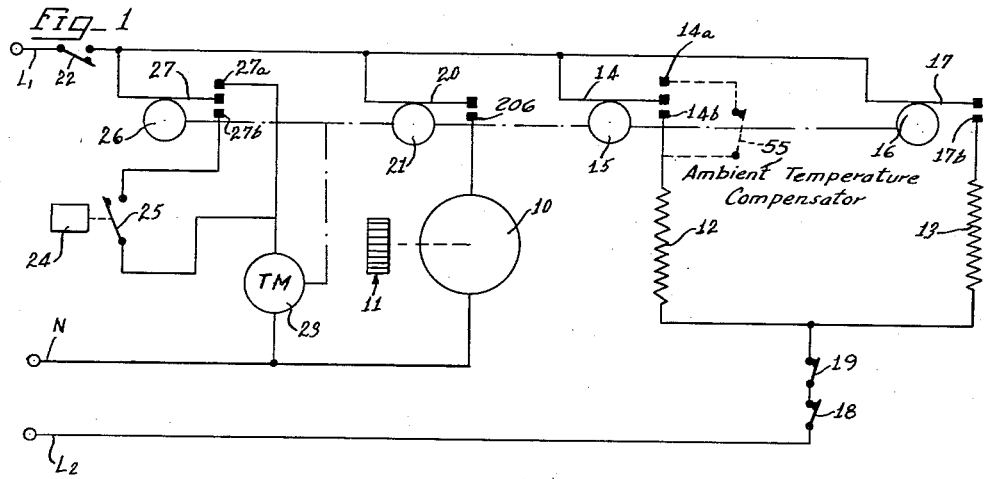
Fig_2
| | | 1 | 2 | 3 | 4 | 5 | 6 | 7 |
|---|---|---|---|---|---|---|---|---|
| TIMER MOTOR | 27A | | | | | ▨ | ▨ | ▨ |
| SENSOR THERMOSTAT | 27B | ▨ | ▨ | ▨ | ▨ | ▨ | | |
| DRIVE MOTOR | 20B | ▨ | ▨ | ▨ | ▨ | ▨ | ▨ | ▨ |
| COMP. THERMOSTAT | 14A | ▨ | ▨ | ▨ | ▨ | ▨ | | |
| 2800 WATT | 14B | ▨ | | | | | | |
| 2800 WATT | 17B | ▨ | ▨ | ▨ | ▨ | | | |
TIMER SCHEDULE
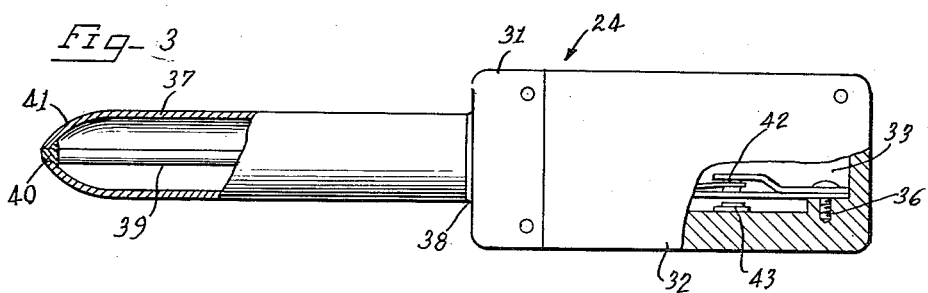
Inventors
Clifton A. Cobb
James T. Williams
by Hill, Sherman, Meroni, Gross & Simpson  Attys.

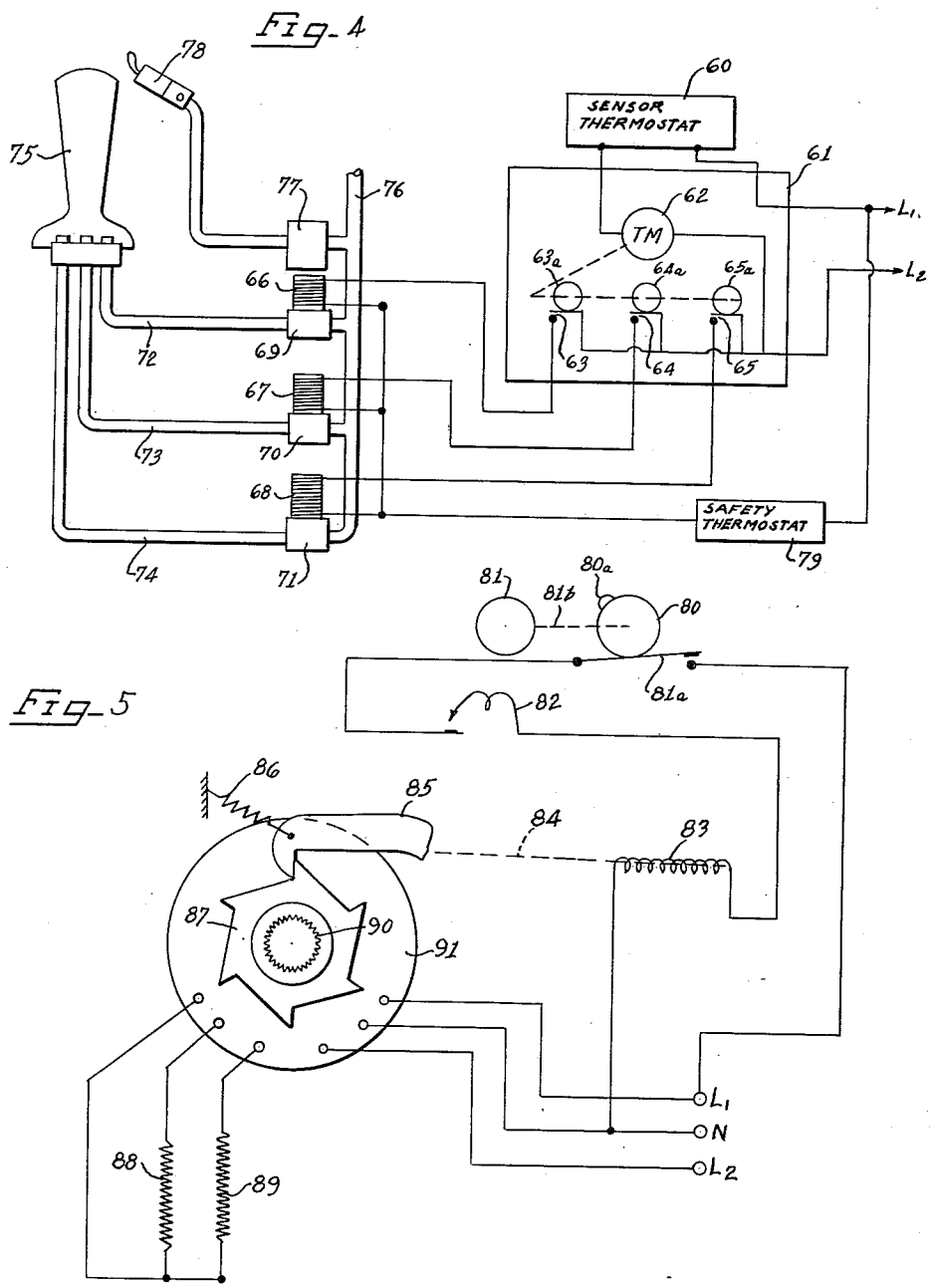

Feb. 25, 1964   C. A. COBB ETAL   3,122,358
TIMER HEAT REDUCTION DRIER CONTROL
Filed July 26, 1960   3 Sheets-Sheet 3
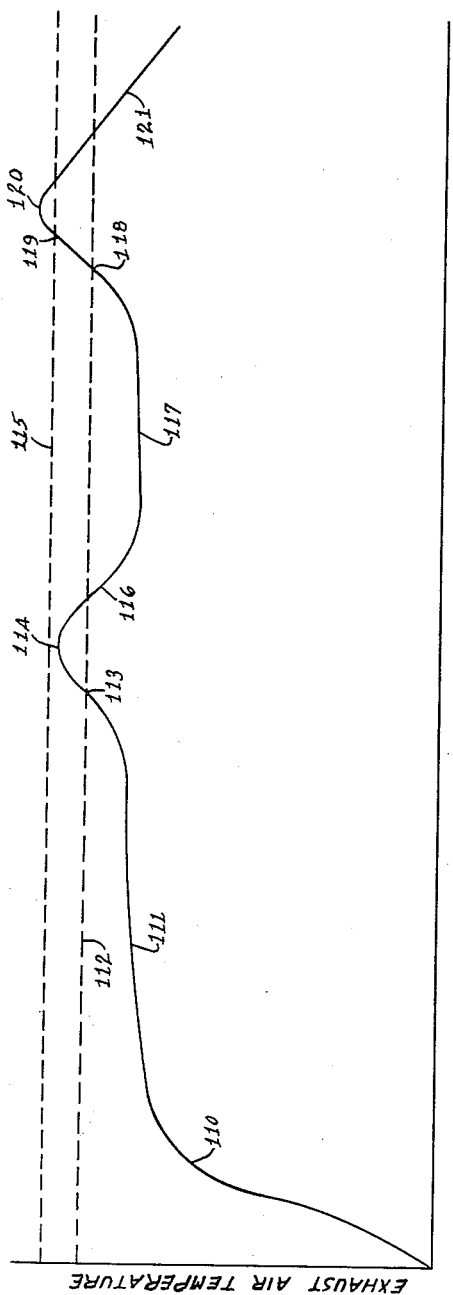
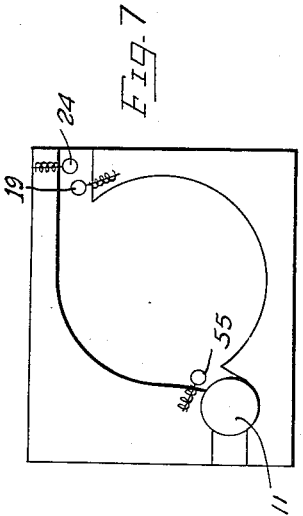
Inventors
Clifton A. Cobb
James T. Williams
by Hill, Sherman, Meroni, Gross & Simpson
Attys.

United States Patent Office 3,122,358
Patented Feb. 25, 1964

3,122,358
TIMER HEAT REDUCTION DRIER CONTROL
Clifton A. Cobb, St. Joseph, and James T. Williams, Stevensville, Mich., assignors to Whirlpool Corporation, St. Joseph, Mich., a corporation of Delaware
Filed July 26, 1960, Ser. No. 45,408
6 Claims. (Cl. 263—10)

The present invention relates broadly to a laundry method and appliance, and is more particularly concerned with a dryer control responsive to the sensible dryer exhaust temperature to reduce the heat input when the exhaust temperature is in excess of a predetermined point.

It is known that in a drying operation such as occurs in a clothes dryer, as a particular clothes load becomes dry, less and less of the heat supplied to the incoming dryer air is converted into latent heat of vaporization of water, while more and more of the incoming heat becomes sensible heat and, therefore, results in a rising exhaust air temperature. It is further known that clothes being dried can withstand more heat while still relatively wet, and that the temperature in a dryer reaches maximum at the end or dryest portion of the drying cycle. Accordingly, by sensing the exhaust air temperature and controlling the heat input in response to the measured temperature, a relatively high heat input may be provided at the beginning of a drying cycle and less heat input near the end thereof, whereby there is obtained an efficient and harmless drying of the clothes load.

It is accordingly an important aim of the present invention to provide an improved laundry method and appliance which accomplishes the named objectives.

Another object of this invention lies in the provision of improved control means for a domestic dryer apparatus.

Still another object of the instant invention is to provide a relatively low cost automatic control system for terminating operation of a dryer when the clothes are dry, and which functions effectively with a wide variety of garment materials and load weights.

An even further object of the present invention lies in the provision of a dryer control system which eliminates the necessity of sole reliance upon clock timers in order to terminate the application of heat energy to articles dried by use of this system.

A still further object of the instant invention is to provide a dryer apparatus and method operating at a controlled maximum drying temperature so that there is no overdrying of the materials under treatment and consequently no staining or browning thereof.

Another object of the invention lies in the provision of a dryer control system which permits the use of relatively high heat inputs when the clothes are relatively moist and which successively reduces the amount of heat energy applied as the moisture content of the clothes is reduced.

Other objects and advantages of the invention will become more apparent during the course of the following description, particularly when taken in connection with the accompanying drawings.

In the drawings, wherein like numerals designate like parts through the same:

FIGURE 1 is a circuit diagram illustrative of one dryer control system embodying the novel concepts of this invention;

FIGURE 2 is a program chart showing the operation of the control means of this invention as utilized in the circuit of FIGURE 1;

FIGURE 3 is a cross sectional view of one form of thermostat structure which can be utilized in this invention;

FIGURES 4 and 5 are more or less diagrammatic views embodying suitable circuitry and illustrative of other arrangements for reducing heat input in response to exhaust air temperature;

FIGURE 6 is a drying curve plotting time against control temperature and illustrating the operation of a control system and method provided in accordance with the principles of the present invention;

FIGURE 7 is a schematic illustration of a dryer showing an air flow circuit in a dryer chamber with the various control means disclosed herein located either in the inlet end of the air circuit or the outlet end thereof.

Although the principles of the present invention are of general applicability, a particularly useful application of the disclosures herein made, involves the drying of clothes in a domestic clothes dryer. It will be understood, however, that the inventive subject matter may be applied with equal facility to other forms of drying apparatus.

Drying is the removal of an evaporable fluid, usually water, which may be accomplished by heating the wet material to a temperature above that corresponding to the vapor pressure of the surrounding atmosphere, or by reducing the vapor pressure of the surrounding atmosphere below the vapor pressure of the liquid in the material to be dried.

Changing a substance to a vapor state is a process called vaporization, a term which includes boiling and sublimation, as well as evaporation, which is a conversion of liquid to the vapor state that occurs only at the surface of the liquid.

Evaporation occurs at all temperatures and continues until the liquid disappears, or until the space surrounding the liquid has become saturated with vapor. In the process of evaporation, a liquid is gradually transformed to a vapor by loss of molecules at its surface. The molecules of a liquid are regarded as in a state of continual, but disordered motion, moving about in all directions and with various speeds. In this motion there will be instances where a molecule is approaching the liquid surface with a sufficient velocity to carry it beyond the range of attraction of the surface molecule; this molecule then leaves the liquid and becomes a molecule of vapor.

The rate of evaporation of free moisture to be removed from a batch of materials such as clothes, depends upon the vapor pressure of the moisture in the material corresponding to its temperature and the vapor pressure of the moisture in the air corresponding to its absolute humidity, although it will be appreciated that other factors such as the physical properties of the materials being dried and the movement or flow of the ambient air are also involved. In any event, the rate of evaporation is proportional to the difference in vapor pressure between the liquid in the materials to be dried and that of the liquid in the immediate vicinity of the materials to be dried.

The quantity of heat which must be given to a unit mass of liquid to convert it to vapor without a change of temperature, is called the heat of vaporization.

Thus, in a clothes drying operation, the addition of a predetermined quantum of thermal energy per unit of time to an air stream directed into a drying zone, will either result in the conversion of the free moisture into vapor, and will thus be a measure of the heat of vaporization given to the free moisture on the materials within the drying zone, or the temperature of the drying zone and the materials contained therein will be elevated by direct conduction and convection. Thus, if the addition of thermal energy is terminated, the air stream will cool down at a rate reflecting the evaporative conditions in the drying zone.

In addition, and assuming a relatively constant input of thermal energy to the air stream throughout the drying cycle, when the clothes are relatively wet in the substantially constant drying rate portion of the cycle, the major amount of heat input added results in the conversion of the free moisture into vapor, and the minor amount elevates the temperature of the drying zone. On the other hand, as the clothes reach a relatively dry condition in the remaining portion of the drying cycle and contain little free moisture, the major amount of thermal energy added raises the drying zone temperature, while a minor amount of the added heat input is used to convert the liquid to vapor. As a result, when a constant heat input is used throughout the drying cycle, there is not only a waste of thermal energy as the clothes approach dryness and for the remaining portion of the cycle, but as well, a continuance of a constant or uniform heat input to relatively dry clothes frequently results in staining or browning of the load. Further, in many systems the heat input is maintained at a relatively low level in order to avoid overdrying near the end of the drying cycle, and as a result the heat input level when the clothes are relatively wet is much lower than the clothes can actually withstand in their wet condition. This of course unduly prolongs the drying cycle.

In accordance with the principles of this invention, there is located in the exhaust air stream an extremely sensitive and rapid acting sensor thermostat in control of a timer motor during addition of thermal energy to the air stream. The sensor thermostat is of the "close-on-rise" type with a very small opening and closing temperature differential, and initiates operation of the timer motor when the exhaust air temperature reaches a predetermined elevated point. The timer motor is then in control of operation of the dryer, and after a predetermined interval of maximum heat input, one or more of a plurality of heating elements is deenergized, providing what may be termed "step down dry control." With at least one of the heating elements deenergized and if sufficient moisture remains in the clothes load, a reduction in exhaust air temperature will occur and reopen the sensor thermostat to deenergize the timer motor and continue a lower or reduced thermal energy addition until the exhaust air temperature again rises above the control point to restart the timer motor, placing the dryer operation under control of the timer. In this manner, it may now be seen, a maximum heat input can be provided for the relatively wet materials to be dried without danger of overdrying near the end of the drying cycle, and as well, the thermal energy input is reduced in steps in accordance with the exhaust air temperature, to produce substantial power savings and to prevent staining or browning of the clothes load.

It will be understood that the principles of the present invention are of general applicability, however, a particularly useful application of the principles of this invention may be made, as has been stated, to a domestic clothes dryer such as is customarily referred to as a home laundry appliance. Moreover, the improvements of the instant invention are adaptable for use with an automatic dryer control comprising components and circuitry which, in some respects, are essentially conventional. For example, it is contemplated that the present invention would be utilized in a domestic dryer of the type utilizing a machine motor shown in FIGURE 1 at 10 used for rotatably driving a tumbling drum (not shown) and a diagrammatically illustrated air translating means 11 such as a blower. The drum constitutes a treatment zone or drying chamber in which a batch of wet clothes are to be dried and through which air is moved by the air translating means 11. This invention is also intended to encompass that type drying apparatus in which the drum is positioned within a closed or substantially closed casing.

In the form of the invention shown in FIGURE 1, a pair of heating means 12 and 13 are provided, although as will be later noted, the number of the heating means may be varied to provide a wider range of heat inputs, and as well, the heating elements can be gas-fired regulated by appropriate electric or hydraulic control means. The heating elements 12 and 13 are connected in parallel, and leading thereto is power line L-1 to which is connected cam switch 14, which controls the energization of element 12, having a top position 14a and a bottom position 14b under control of a timer cam 15, while energization and deenergization of heating element 13 is under control of timer cam 16 controlling cam switch 17 which has solely a bottom position 17b. The heating elements 12 and 13 connect with a main line L-2 in which there is located a normally closed safety thermostat 18 and a normally closed control thermostat 19. The control thermostat 19 is located in the exhaust air stream and would be less sensitive to the instantaneous exhaust temperatures than the sensor thermostat (to be later described) which is in control of the timer motor when either or both of the heating elements 12 and 13 can be energized.

The machine or drive motor 10 is energized by cam switch 20 having only a bottom position 20b and actuated by a timer cam 21. As will be later noted in connection with a complete description of an illustrative drying cycle, the drive motor 10 and heating elements 12 and 13 are energized by closing a door switch 22 in line L-1, and by manually turning the timer drum (not shown) to a first position wherein the profiled cams 21, 15 and 16 permit completion of a circuit through the power line L-1 and cam switches 20, 14 and 17.

The illustrative circuit of FIGURE 1 further includes a timer motor 23, a sensor thermostat 24 in control of a normally open snap switch 25, and a timer cam 26 in control of a cam switch 27 having a top position 27a and a bottom position 27b. It may be noted for the present that rotation of the timer cam 26 by the initial manual presetting of the timer drum closes the cam switch 27 to its down position 27b to provide one branch of a circuit to the normally open thermostat switch 25; however, the timer motor 23 is not thereby energized, but is only energized by the sensor thermostat 24 closing switch 25 when either or both of the heating elements 12 and 13 can be energized. In other words, when thermal energy can be added to the air stream, a sensing of the exhaust air temperature by the thermostat 24 energizes or deenergizes the timer motor 23. In this manner, as will be brought out in detail hereinafter, an initial high heat input is provided in the early portion of the drying cycle when the clothes are quite wet, and when the exhaust air temperature reaches a predetermined level to which the sensor thermostat 24 is set, the switch 25 closes to energize the timer motor 23, which is then in control of the dryer operation to lower the heat input to the dryer. However, if with this lower heat input the exhaust air temperature drops below the reset point of sensor thermostat 24, the sensor thermostat 24 opens to deenergize the timer motor 23 and thermal energy at a reduced input is added to the air stream until the exhaust air temperature again rises, indicative of the fact that a lesser amount of the thermal energy in the incoming dryer air is converted into latent heat of vaporization of water in the clothes.

The sensor or close-on-rise thermostat 24 may take various forms, and in FIGURE 3 an illustrative structure referred to as a "rod and tube" thermostat is shown, although the particular structural details thereof do not constitute a part of the instant invention. Other thermostats such as the bimetal disc type could be used. As appears in FIGURE 3, the thermostat or sensing device 24 comprises a mounting bracket 31 to which is attached a switch housing 32 conveniently comprising a two-part construction providing a switch cavity 33 in which is retained the snap-acting switch designated generally as 25 and mounted in firm assembly within the switch cavity 33 by one or more fastening members indicated at 36.

An outer sensing tube 37, as for example, of stainless steel is secured in any suitable manner to the mounting bracket 31, as at 38, and an inner sensing rod 39 of a metal with a low coefficient of thermal expansion such as Invar is securely fastened at its end opposite the switch mechanism to the outer sensing tube 37, as at 40. It may be noted that the tube 37 has a nose portion 41 forming a closed end wall suitably apertured to receive the end of the rod 39, which is secured in firm assembly with the tube 37, as for example by welding.

Sensor thermostat 24 is installed so that the outer stainless steel tube 37 is completely within the exhaust air stream of the dryer and will thus at all times be at the same temperature as the exhaust air stream. Since stainless steel readily expands and contracts with temperature changes and since Invar does not, the thermostat can be constructed so that as the stainless steel tube 37 expands with an increasing air exhaust temperature the center Invar rod 39 which does not expand will be moved relative to the switch cavity 33 which forces switch member 42 to contact switch member 43 thus closing switch 25 with a snapping action at the desired air exhaust temperature. For this dry control system the sensor thermostat 24 has, in practice, been designed so that the switch 25 will reopen at approximately 2° below that at which it closed.

The contact members of the snap-acting switch 25 are shown at 42 and 43, and it will be understood that such contact members are connected by appropirate terminals to conductor wires in FIGURE 1, so that the thermostat or control device 24 may be incorporated in the control circuitry of an apparatus to be regulated.

Referring again to FIGURE 1, there is shown (in dotted lines) as connected between the heating element 12 and the top position 14a of the cam switch 14 a normally closed thermostat 55 which compensates for input, air flow and ambient variations. Since this thermostat 55 is not basic to the operation of the circuit shown in FIGURE 1, its operation will be explained after an explanation of FIGURES 1 and 2 has been set forth independently of compensator thermostat 55.

The operation of the step down dry control system of FIGURE 1 will now be described, with additional reference being made to the timer schedule of FIGURE 2. The timer drum is manually turned or rotated to the beginning of the first interval of time, and this initiates the drying operation by starting the drive motor 10 through rotation of the profiled cam 21 which actuates switch 20 to its bottom position 20b. In addition, the cam switch 14 is actuated by the timer cam 15 to its bottom position 14b, and similarly, the heating element 13 is energized by the timer cam 16 actuating the cam switch 17 to its bottom position 17b. This manual rotation of the timer drum causes the profiled cam 26 to actuate the cam switch 27 to its bottom position 27b carrying power to one contact of the snap-acting swich 25. Of course, the door switch 22 has to be closed to bring power to the circuits actuated by the timer switches. At this time a circuit to the timer motor 23 can only be completed when the snap-acting switch 25 is closed by action of the sensor thermostat 24, which as noted, is in the exhaust air stream. Illustratively, the sensor thermostat closing temperature may be 145° if elements 12 and 13 are each 2800 watts, and the opening temperature of the normally closed control thermostat 19 may be 150°, both Fahrenheit.

As appears in FIGURE 2, setting forth a typical timer schedule, when the sensor thermostat temperature reaches 145° F., there is one interval such as a one minute period of operation when both of the heating elements 12 and 13 remain energized. During this one minute of operation of the timer motor 23, the sensor thermostat 24 may increase in temperature somewhat over 145°, however, experience has demonstrated that there is little likelihood that the 150° F. cut-out temperature of the control thermostat 19 will be reached. At the end of this one minute of operation of timer motor 23, timer cam 15 actuates the cam switch 14 from its bottom position 14b to its top position 14a deenergizing the heating element 12. With normal conditions prevailing in the inlet air stream, the compensator thermostat 55 will be open and heating element 12 will be deenergized. However, if a low ambient temperature, a low voltage or a high air flow were the prevailing condition, the compensator thermostat 55 would be closed and both heating elements 12 and 13 would remain in operation.

It was earlier noted that more than a pair of heating elements 12 and 13 could be employed, and of course, the specific wattage values for the heating elements will depend upon the particular application. If more than two heating elements are used it would only be necessary to add additional timer switches and the control would be the same as shown in FIGURES 1 and 2. Illustratively, however, the heating elements 12 and 13 can be assumed to be 2800 watt heaters in a description of the present system. It has been noted that by action of the sensor thermostat 24 the timer motor 23 has deenergized the heating element 12. If the clothes in the dryer are still quite wet when the heating element 12 is deenergized, the exhaust air temperature would drop under this low one element input to reopen the sensor thermostat 24. Opening of this thermostat and breaking of the circuit across the snap-acting switch 25 deenergizes the timer motor 23, and clothes drying would continue with only the heating element 13 energized until the exhaust air temperature rises to the timer operating temperature of 145° F. of the sensor thermostat 24. If, on the other hand, the clothes were quite dry when the drying system was switched from 5600 to 2800 watt operation (which for average drying variables is the normal condition), the exhaust air temperature would continue to rise, although with a decreased slope, until the timer motor caused the timer cam 16 to release the cam switch 17 from contact 17b to deenergize the heating element 13 if the control thermostat 19 remains closed during this time.

Illustratively in the timer schedule of FIGURE 2, there is shown one interval of maximum heat input and three additional intervals 2, 3 and 4 of reduced heat input when the heating element 12 is deenergized. It is considered unlikely that with only the single element 13 in operation that the exhaust air temperature rise could cause the control thermostat 19 to trip at or about its 150° F. control point during intervals 2, 3 and 4. This is because with only the heating element 13 in operation, there is a decreasing rate of exhaust temperature rise, and further because the control thermostat 19 is, in practice, less sensitive than the sensor thermostat 24, so that it has in effect a built in time lag such that the exhaust air temperature would be greater than 150° F. when the control thermostat 19 opens. However, even if the control thermostat 19 should open, it is extremely unlikely that the exhaust air temperature would decrease sufficiently to reopen the sensor thermostat 24 to stall the timer motor 23. Thus if the exhaust temperature continues to rise after timer interval 1, it is likely that timer motor 23 will run continuously through intervals 2, 3 and 4 independently of control thermostat 19 under the influence of normal drying variables.

The sequence of steps described would continue until enough time had accrued of timer motor operation to interval 5 in FIGURE 2. At this time, both heating elements 12 and 13 would be deenergized by the timer motor, and the timer motor would now be energized independently of the sensor thermostat 24 by rotation of the timer cam 26 to actuate the cam switch 27 to its top position 27a, of course releasing the cam switch from its down position 27b in control of the sensor thermostat 24. The laundry machine would then operate in a cool down period for the next three intervals shown in FIGURE 2, and the machine would shut off and end the drying cycle.

The compensator thermostat 55, if used in the dry control circuit of FIGURE 1, is positioned in the air inlet stream to the load being dried and is influenced by the source of heat input. The temperature that this normally closed thermostat 55 senses is directly effected by the ambient air temperature, the flow rate of the air stream through the dryer, and the quantity of heat being supplied by the heat source, thus this thermostat serves to measure the absolute heat value per unit volume of air entering the drying chamber. It is desirable to choose an opening value for thermostat 55 such that if the combination of drying variables present (ambient air temperature, air flow, and heat input) produce normal input and exhaust air stream temperatures, the thermostat 55 will open such that at the end of timer interval 1, as shown in FIGURE 2, when timer cam 15 moves switch arm 14 from contact 14b to 14a the dry cycle will proceed under the operation of element 13 only as previously explained.

If, however, the compensator thermostat 55 senses a combination of drying variables that give inlet and exhaust air stream temperatures considerably below normal (low ambient air temperatures, high air stream flow rate, and low heat input due to low voltage or poor gas quality each tend to produce below normal conditions), the compensator thermostat 55 will not open and when timer cam 15 at the end of timer interval 1 moves switch arm 14 from contact 14b to contact 14a heating element 12 will remain energized and the dry cycle will continue through timer intervals 2, 3 and 4 with both heating elements 12 and 13 operating.

Since a combination of drying variables that give below normal inlet and exhaust air stream temperatures also results in the load being dryer when the sensor thermostat switch 25 first closes than with normal drying conditions present, the action of the compensator thermostat 55 is desirable since it eliminates the possibility of the exhaust air stream temperature dropping under one heating element operation and thus reopening sensor thermostat switch 25 to deenergize the timer motor 23 and unnecessarily prolong the overall drying time. The thermostat 55 also operates as a safety device in the presence of extremely low inlet and exhaust air stream temperatures in that if the dry cycle were allowed to continue with one heating element operation after timer interval 1 the exhaust air stream temperature would drop to stall the timer motor 23 and with this one heating element operation it is possible that the exhaust temperature would never reach a value necessary to again energize timer motor 23 and the dry cycle would continue indefinitely. The thermostat 55 would prevent one element operation under these drying conditions and eliminate this possibility.

It is also possible that in selecting a closing (after it has opened) value for thermostat 55 a value may be chosen such that even when normal drying conditions are present it is possible that after timer interval 1 when the drying is switched to the operation of heating element 13 only and if the load still contains enough moisture that the inlet air stream temperature will drop to the chosen closing value and reenergize heating element 12. Heating element 12 would then cycle on and off until heating element 13 along could close sensor thermostat switch 25 to reenergize timer motor 23 to complete the cycle. This feature also prevents the overall drying cycle from being unnecessarily prolonged.

It should be readily apparent from this description that a similar result would be produced if the lower end of compensator thermostat 55, as shown in FIGURE 1, were connected to a third heating element (not shown) rather than being connected to the top of heating element 12.

Even though, as earlier explained, the compensator thermostat is not basic to the control system of FIGURES 1 and 2, its use does give the control system the versatility desirable in mass produced domestic machines that are exposed to the complete extremes of the very important drying variables. Most automatic dry control systems fail because they are not versatile. This compensated system therefore represents an improvement over most presently known dry control systems which do not give satisfactory results in conditions of these extreme variables.

A somewhat similar step down dry control system is illustrated in FIGURE 4, and shown therein are only those parts necessary to an understanding of the sequence of steps of heat input reduction as signaled by the exhaust air temperature. Of course the arrangement of FIGURE 4 embodies a main drive motor and other laundry machine structure.

As appears in FIGURE 4 in more or less diagrammatic form, there is provided a sensor or close-on-rise thermostat 60, such as that shown in FIGURE 3, electrically connected to a step switching assembly 61, which includes a timer motor 62 coupled to cams 63a, 64a and 65a to operate switches 63, 64 and 65. Power lines L–1 and L–2 connect with the thermostat 60 and step switching assembly 61, and the cam operating switches 63, 64 and 65 are electrically connected to solenoid means 66, 67 and 68, respectively, which are in control of valve means 69, 70 and 71 in gas branch lines 72, 73 and 74 leading to a main gas burner 75. Gas to the valves 69, 70 and 71 is supplied from an inlet conduit 76, and a valve 77 controls the gas supply to a pilot 78. If desired, a safety thermostat 79 may be employed in the illustrated circuit.

The sensor or close-on-rise thermostat 60 is located in the exhaust or output air stream, and when the laundry machine is started, the cam switches 63, 64 and 65 are positioned to provide fully open gas valves 69, 70 and 71. Desirably, the valves would be sized to provide different flow rates, as for example, valve 69 could have a relatively low flow rate, valve 71 a relatively high flow rate, and valve 70 an intermediate flow rate. Of course, the gas system shown is illustrative only, and in substitution for the gas valves and related structure there could be used electrical heating elements, as for example, three elements in parallel providing two 3500 watt elements and a 1500 watt element, so that the elements can be coupled to give steps of 8500, 7000, 5000, and 3500 watts.

In the gas system as illustrated in FIGURE 4, when the thermostat 60 reaches a predetermined or control temperature, as for example, 150° F., the timer motor 62 is started to rotate the timer cams 63a, 64a, and 65a controlling switches 63, 64, and 65. One minute of timer motor operation will step the input down to the next level by opening switch 65 which will deenergize gas valve 71. Upon stepping down the input, the output or exhaust temperature decreases, opening the thermostat 60 and stopping the timer motor 62. As the clothes dry, the temperature again rises and closes the thermostat contacts, to start the timer motor 62 again, which then opens switch 64 to deenergize gas valve 70. This novel operation continues until the input load or gas flow is switched off entirely and the clothes are properly dried.

In the system of FIGURE 4 and in the other systems illustrated in the drawings, it is apparent that there is herein provided a relatively low cost automatic control system which runs relatively cool with controlled maximum drying temperature, so that there is no staining or browning of the load. Each system works effectively over a relatively wide range of garment materials and load weights, and each system is relatively independent of room ambient and humidity. The step down dry control systems of this invention further permit extremely high inputs to be used in the initial phases of drying when the clothes are relatively wet and therefore not harmed by a relatively large amount of thermal energy. As is now apparent, a relatively high initial heat input is permitted since the addition of thermal energy is successively reduced as the clothes or other materials decrease in moisture content.

A further step down dryer control system embodying the features of this invention is illustrated in FIGURE 5 to which reference is now made. In this arrangement, a cam means 80 having an active surface 80a thereon and suitably driven as at 81b by a synchronous motor 81 is in control of a switch 81a provided in a circuit which includes a normally open thermostat 82 of the close-on-rise type, such as shown in FIGURE 3, connecting with a solenoid coil 83 having a link or rod portion 84 connected to a pawl portion 85. The pawl or ratchet advancing portion 85 may connect with a return spring 86 terminating in fixed structure as shown, and the pawl portion 85 is in engagement with a ratchet advancing mechanism 87 in control of any desired number of switch positions which select particular wattages or heats. Illustratively, heating elements 88 and 89 may connect with contacts of a five temperature switch (details of which are not shown) to permit generation of five different wattages or heats, as for example 8400, 5600, 2800, 2100 or 700 watts. These different wattage values are achieved by the switch 91 placing the heating elements in different electrical combinations across the input lines L-1, N, and L-2.

The ratchet mechanism 87 may mount a hand manipulable knob 90 to initially set the input control switch 91 to a desired value, the specific value of which would of course depend in part upon the fabrics to be dried. In other words, if towels or like relatively heavy fabrics were to be dried, the maximum heat of 8400 watts would be employed, whereas if delicate fabrics were to be dried, a somewhat lower initial maximum heat would be utilized. As appears in FIGURE 5, the input control switch 91 is supplied with electrical energy through leads L-1 and L-2 and a neutral or ground line N.

In operation of the system of FIGURE 5, the input control switch 91 is set at the maximum heat by manual rotation of the knob 90, and with the laundry machine started in the manner described in connection with FIGURE 1, heating is initiated together with the conventional tumbling and blowing. Rotation of the momentary switch cam 80 under action of synchronous motor 81 momentarily closes the switch means 81a at predetermined intervals, which may be every one minute, causing the thermostat switch 82 to be in circuit with the advance solenoid coil 83. If the thermostat switch 82 is closed by the exhaust air temperature having reached a pre-set point, the solenoid coil 83 is energized for the length of the momentary switch closure. Energization of the solenoid coil 83 produces a pulling action on the pawl portion 85 to rotate the ratchet advancing mechanism 87, moving the temperature switch 91 to a position of the next wattage lower than maximum wattage. The reduced heat input will thereupon shortly allow the thermostat 82 to reset to open, and if after several sensings by the interval device 80 the thermostat is again closed, the solenoid coil 83 will again be momentarily energized, moving the temperature switch 91 to the next lower wattage. This action continues until the temperature switch 91 is positioned on the lowest wattage setting. Another position could be provided on the ratchet below the low wattage setting to initiate a timer or thermostat controlled cool down period. This last ratchet position could also be an off position.

It is possible in the control systems shown in FIGURES 4 and 5 that the load may be in a state of dryness when thermostats 60 and 82 first close that they would not reopen even with the reduced inputs and thus the timer devices would complete the cycles in a minimum of time.

To complete the description of the instant system, reference is made to FIGURE 6 which plots in graph form drying time against exhaust air temperature. The compensator thermostat 55 is neglected in this explanation. For purposes of illustration, it is assumed that the maximum heat input of the system exemplified in FIGURE 6 is 5600 watts, and that the reduced thermal energy input after one interval of operation of the sensor thermostat 24 is 2800 watts as is shown in FIGURES 1 and 2.

In the plot of FIGURE 6, there is indicated by the numeral 110 the increase in exhaust air temperature as the cold dryer heats rapidly. That portion of the drying curve when the major portion of the input is being used as heat of vaporization, characterized by only a small exhaust temperature increase, is indicated by the numeral 111. However, when the exhaust air temperature reaches the setting of the sensor thermostat 24, this being indicated by the line 112, the timer motor is energized, the particular point of energization being indicated in FIGURE 6 by the numeral 113, this being an illustrative point at which the plot intersects the timer control or sensor thermostat temperature. As was earlier stated, the timer motor 23 during the heating cycle is only energized by the sensor thermostat 24, and accordingly, the length of drying time from initiation of machine operation to the point 113 is variable.

As is indicated in the program chart of FIGURE 2, there is a one minute period of operation after the timer is energized when there is still maximum heat input, and this is shown in FIGURE 6 from the point 113 to the high point 114. At the maximum point 114, which can be seen to be slightly less than the pre-set temperature level of the control thermostat 19, indicated in FIGURE 6 by the number 115, one or more (if more than two heating elements are used) of the heating elements are deenergized by the timer and the exhaust air temperature decreases assuming that enough moisture is still present in the load to cause the exhaust temperature to decrease with one heating element operation. As the exhaust temperature decreases as shown at 116 of FIGURE 6, a temperature is reached whereby the sensor thermostat contacts 25 will reopen to deenergize timer motor 23. The sensor thermostat is designed so that the reopening of the sensor thermostat will occur at about 2° below the temperature necessary to close it. The exhaust temperature will continue to decrease until there is a balance between the new heat input and the moisture remaining in the load.

The exhaust air temperature, as indicated in FIGURE 6, then continues along a relatively constant line (117) with the reduced heat input until sufficient moisture is removed from the clothes and a greater amount of the heat input is in the form of sensible heat, rather than being used to convert the moisture into latent heat of vaporization. When the exhaust air temperature reaches the trip temperature of the sensor thermostat 24, or the line 112 in FIGURE 6, the timer motor is again energized, at approximately the point indicated by the numeral 118 in FIGURE 6. The drying time span from deenergization of the timer motor on curve portion 116 to reenergizing of the timer motor at 118 will be of variable time. After the reenergization of the timer motor 23 at the point 118, the exhaust temperature will continue to increase until the total timer time of intervals 2, 3 and 4 is consumed at which time timer switches 14 and 17 will deenergize all heat input or until as shown in FIGURE 6 the exhaust temperature exceeds the opening temperature 115 of control thermostat 19 as at point 119. Of course, the action of control thermostat 19 has no effect on timer motor 23 as is shown in FIGURE 1.

It may be further observed from FIGURE 6 that when the remaining heating elements are deenergized at point 119, there is a slight "overshoot" in temperature to the point 120 by the heat buildup, and thereafter the exhaust air temperature decreases along the line 121 during the cool off period (intervals 5, 6 and 7), until the drying cycle is terminated at 122.

The example as shown in FIGURE 6 is intended to show the inter-relationship between all of the components as shown in FIGURE 1 and for this reason the portion of the curve between the points 114 and 119 does not necessarily represent the average drying curve of a clothes load being controlled by the dry control system shown in FIGURE 1. As pointed out earlier, under average conditions it is likely that after the point 114 has been reached, corresponding to the end of interval 1 of FIGURE 2 when the heating element 12 is deenergized (neglecting the compensator thermostat 55), the exhaust temperature will continue to increase although at a lesser slope until the timer has run continuously to consume all of the available timer time of intervals 2, 3 and 4. This happens since it is likely that the load will be at almost complete dryness at the point 114. If the load were completely dry at the point 114, it is possible that control thermostat 19 could open up at some point during timer intervals 2, 3 and 4.

There has been discussed in the preceding paragraphs various changes and modifications which can be effected in the dryer control system of this invention, and it is believed apparent therefrom that numerous variations can be practiced without departing from the novel concepts of this invention.

The embodiments of the invention in which an exclusive property or privilege is claimed are defined as follows:

1. In a dryer, automatically operable through a drying cycle, means for driving a stream of air for drying materials placed in a treatment zone, plural heating means for adding thermal energy to said stream of air to enhance the drying characteristics thereof, and control means including a timer motor, circuit means for controlling said plural heating means including switch means operated by said timer motor, and a sensor thermostat controlling the operation of said timer motor, said sensor thermostat operable to respond to an upper temperature as a first step of the drying cycle to energize said timer motor, whereupon said timer motor will continue the drying cycle for a time interval at maximum heat input, said timer motor operable after said timed interval to actuate said switch means and deactivating at least one of said plural heaters, thereby stepping down the heat input, said sensor thermostat operable to respond at a lower temperature as a second step of the drying cycle to disable said timer motor, whereupon the drying cycle will be conditioned for a further step down control by said sensor thermostat and said timer motor.

2. In a dryer operable through a drying cycle,
 a timer control including
  a timer motor and
  a plurality of timer operated switch means actuated thereby,
 plural heating means including
  control elements regulated by corresponding timer operated switch means,
 and a circuit means for energizing said timer motor including
  a normally open switch,
 switch actuating means for said switch and being responsive to variations in dryer exhaust temperature,
  said dryer operable during an initial drying period of indefinite time interval,
 whereupon said normally open switch is actuated to a closed position by said switch actuating means in response to attainment of a predetermined temperature to complete said circuit means for energization of said timer motor,
  said timer motor actuating a corresponding timer operated switch means to de-activate one of said plural heating means,
  said switch actuating means operating to re-open said normally open switch upon a decrease in dryer exhaust temperature to a second predetermined value to repeat the cycle until all of the plural heating means are inactivated.

3. In a dryer operable through a drying cycle,
 a step-down control comprising
 a timer motor having a plurality of timer operated switch means actuated thereby,
 plural heating means and air translation means for driving a stream of temperature-conditioned air through a drying zone and including control elements regulated by corresponding timer-operated switch means, and a circuit means for energizing said timer motor including
  a normally open switch,
  switch-actuating means for said switch and being responsive to variations in dryer-exhaust temperature,
 said dryer operable during an initial drying period of indefinite time interval,
 whereupon said normally open switch will be operated by said switch actuating means in response to attainment of a predetermined temperature to complete said circuit means for energization of said timer motor,
  said timer motor actuating a corresponding timer operated switch means to de-activate one of said plural heating means,
  said switch actuating means re-opening said normally open switch upon a decrease in exhaust temperature below a second predetermined value to repeat the cycle until all of the heating means are inactivated,
  said timer motor actuating a corresponding timer operated switch means to continue operation of said dryer and said air translation means during a cool-down period.

4. In a dryer operable through a drying cycle,
 a step-down control comprising
 a timer motor having a plurality of timer-operated switch means actuated thereby,
 heating means supplied by a plurality of gas supply lines,
 a corresponding plurality of solenoid valve means for controlling each of said supply lines,
  said solenoid valve means regulated by corresponding timer-operated switch means,
 and a circuit means for energizing said timer motor including a normally open, temperature responsive switch actuatable in response to variations in dryer exhaust temperature,
 said dryer operable during an initial drying period of indefinite time interval,
 whereupon said normally open switch will be operated in response to attainment of a predetermined temperature to complete said circuit means for energization of said timer motor,
  said timer motor actuating a corresponding timer-operated switch means to close one of said solenoid valve means and a corresponding supply line, thereby to step-down the quantum of thermal energy supplied, said normally open switch being re-opened upon a decrease in dryer exhaust temperature below a second predetermined value to repeat the cycle until all of the gas supply lines are closed.

5. In a dryer operable through a drying cycle,
 a step-down control comprising
  a timer motor having a plurality of timer-operated switch means actuated thereby,
 plural parallel connected electrical heating elements for supplying heat energy and each of said heating elements regulated by a corresponding timer operated switch means,
 and a circuit means for energizing said timer motor including a normally open temperature responsive switch responsive to variations in dryer exhaust temperature, said dryer operable during an initial drying period of indefinite time interval,
 whereupon said normally open switch will be closed in response to attainment of a predetermined dryer exhaust temperature to complete said circuit means for energization of said timer motor,
  said timer motor actuating a corresponding timer-operated switch means to deactivate one of said electrical heating elements, said normally open switch being re-opened upon a decrease in dryer exhaust temperature below a second predetermined value to repeat the cycle until all of the electrical heating elements are deactivated.

6. In a dryer operable through a drying cycle,
a step-down control comprising
   a timer motor having a plurality of timer-operated switch means actuated thereby,
plural heating means including control elements regulated by corresponding timer-operated switch means,
and a circuit means for energizing said timer motor including a normally open switch,
   switch actuating means for said switch and being responsive to variations in dryer exhaust temperature,
said dryer operable during an initial drying period of indefinite time interval,
whereupon said normally open switch is closed in response to attainment of a predetermined dryer exhaust temperature to complete said circuit means for energization of said timer motor,
   said timer motor actuating a corresponding timer-operated switch means to deactivate one of said plural heating means, said one of said plural heating means having in circuit with said corresponding timer-operated switch means a compensator thermostat for sensing dryer inlet temperature and providing an overriding control to keep said one of said plural heating means operative when dryer inlet temperature is below a predetermined level, said normally open switch being re-opened upon a decrease in dryer exhaust temperature below a second predetermined value to repeat the cycle until all of the plural heating means are successively deactivated.

References Cited in the file of this patent

UNITED STATES PATENTS

| | | |
|---|---|---|
| 2,621,423 | Clark | Dec. 16, 1952 |
| 2,796,679 | Dunkelman | June 25, 1957 |
| 2,819,540 | Toma et al. | Jan. 14, 1958 |
| 2,826,825 | Morrison | Mar. 18, 1958 |
| 2,846,776 | Clark | Aug. 12, 1958 |
| 2,882,610 | Hughes | Apr. 21, 1959 |
| 2,928,267 | Frey | Mar. 15, 1960 |
| 2,941,308 | Cobb | June 21, 1960 |
| 3,009,256 | Lynch | Nov. 21, 1961 |
| 3,021,605 | Anderson | Feb. 20, 1962 |
| 3,028,680 | Conlee | Apr. 10, 1962 |